United States Patent [19]

Watson

[11] 3,844,185
[45] Oct. 29, 1974

[54] BACK LASH REMOVAL TOOL
[75] Inventor: Thomas W. Watson, Houston, Tex.
[73] Assignee: Zodell W. Prince, a part interest
[22] Filed: July 27, 1972
[21] Appl. No.: 275,767

[52] U.S. Cl. ................................ 81/3 R, 223/102
[51] Int. Cl. ........................................ B25b 27/00
[58] Field of Search ....... 66/117, 118; 81/3 R, 15.7; 223/102, 103, 104; 289/17

[56] References Cited
UNITED STATES PATENTS
601,123  3/1898  Chase ................................ 223/104
1,564,379  12/1925  Stephens ............................ 66/117

FOREIGN PATENTS OR APPLICATIONS
602,850  6/1948  Great Britain ...................... 223/103

Primary Examiner—Othell M. Simpson
Assistant Examiner—Gary L. Smith

[57] ABSTRACT

A tool for use in removing a back-lash as in a fishing reel, having a shank and handle, and a notch in the shank to receive a loop in the line having the back-lash, and a sliding sleeve on the shank movable over the said notch to lock the line therein, and a notch formed in the shank adjacent the terminal thereof, and out of longitudinal alignment with the first mentioned notch, for engaging other loops of the back-lash.

4 Claims, 3 Drawing Figures

PATENTED OCT 29 1974  3,844,185

BACK LASH REMOVAL TOOL

SUMMARY OF THE INVENTION

A back-lash tool having means for receiving a loop of the back-lash and means for selectively locking said loop in said receiving means, and line receiving means adjacent the free end of said shank, out of longitudinal alignment with the first mentioned receiving means.

DESCRIPTION OF THE PREFERRED EMBODIMENT

Figure 1:
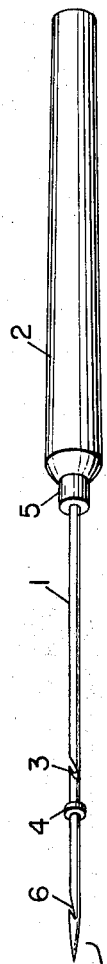
FIG. 1 is a side elevational view of the tool showing the cap in exploded position.
Figure 2:
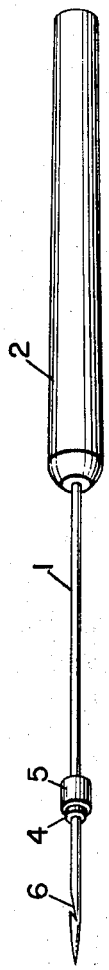
FIG. 2 is a side elevational view of the tool with the line locking means in line locking position.
Figure 3:
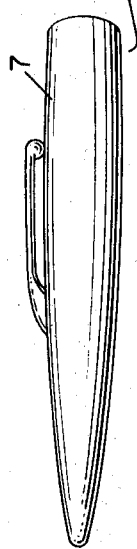
FIG. 3 is a fragmentary view of a fishing reel, illustrating the use of the tool in removing a back-lash.

In the drawings, the numeral 1 designates a shaft having the handle 2 formed of suitable material, from which the shaft 1 extends axially. A tangentially cut slot 3 is formed in the shaft 1 and an annular shoulder 4 is formed on the shank, as by welding a ring thereon, which acts as a stop for the locked member 5, which is slidably mounted on the shank 1. The forward face of the locking member 5 is concave, to receive the stop 5 when the locking member 5 is moved into locking position.

Another slot is formed in the shank 1, as at 6, which is offset from longitudinal alignment with the slot 3 to permit partial wrapping of the line around the shank, and the shank 1 tapers to a point beyond the slot 6. A cap 7 may be mounted over the shank 1 and fits tightly on the end of the handle 2.

In use, when a back-lash occurs, the key loop is located, and the line of that loop anchored in the shank slot 3 and the locking member 5 moved against the stop 4, over the notch 3 partially wrapping the line around the shank and, locking the line therein, and the point of the shank is used to work the shaft under a line in the back-lash, which is secured in the notch 6 and pulled from the tangle, which procedure is continued until the back-lash is cleared. If resistance is encountered to the pulling of the portion of the line engaged by the notch 6, the partial wrapping of the line around the shank of the tool will permit a pulling on the line without danger of cutting the line where it is held in slot 3, the strain being partially applied to the wrapped portion of the line.

What I claim is:

1. A back-lash removal tool comprising an elongated shank having a handle on one end and being pointed on the other, a notch in said shank and a slidable locking means on said shank adapted to be moved over said notch, a stop means on said shank limiting the sliding movement of said locking means and a notch in said shank out of longitudinal alignment with said first mentioned notch, adjacent said pointed end.

2. The device defined in claim 1 wherein said first mentioned notch is tangentially positioned in said shank.

3. The device defined in claim 1 wherein said locking means consists of a cylindrical member having one end face concave and of a greater inside diameter than said stop.

4. The device defined in claim 1 wherein said stop consists of an annular ring fixedly mounted on said shank.

* * * * *